United States Patent Office 3,330,562
Patented July 11, 1967

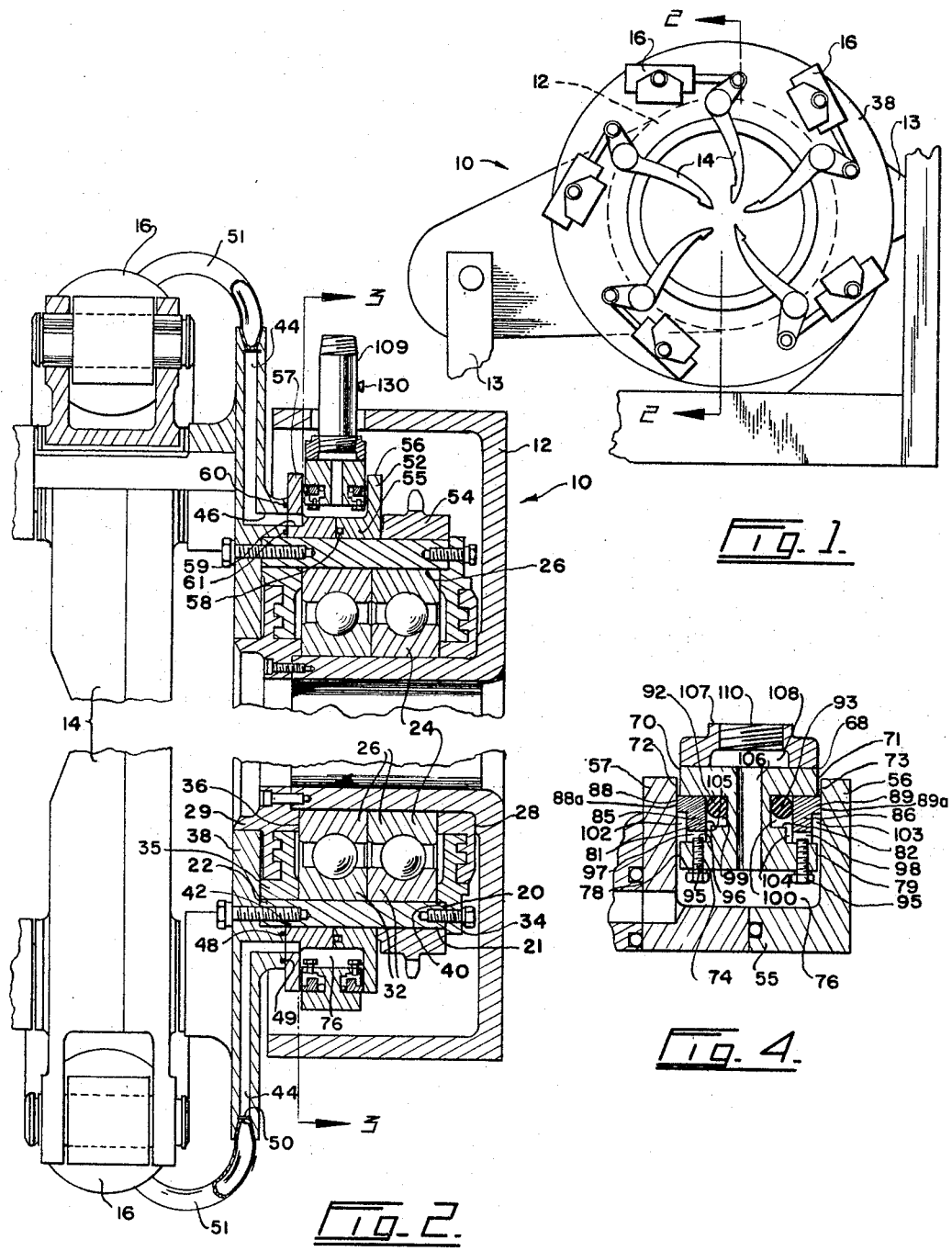

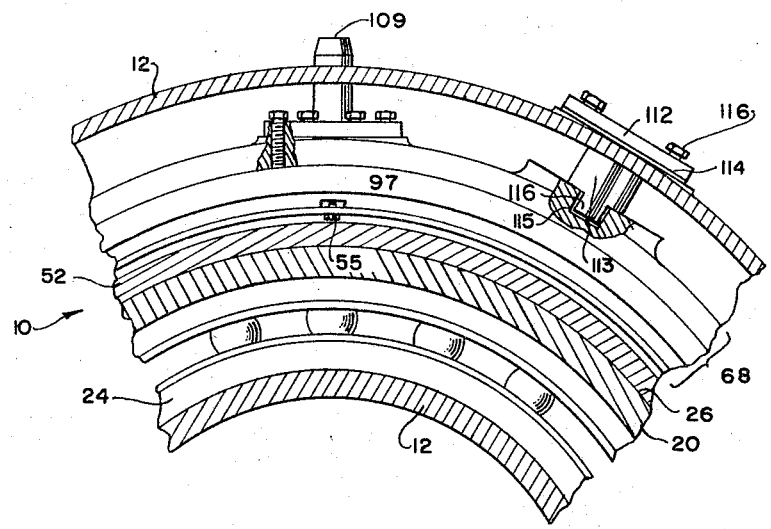
Fig. 3.
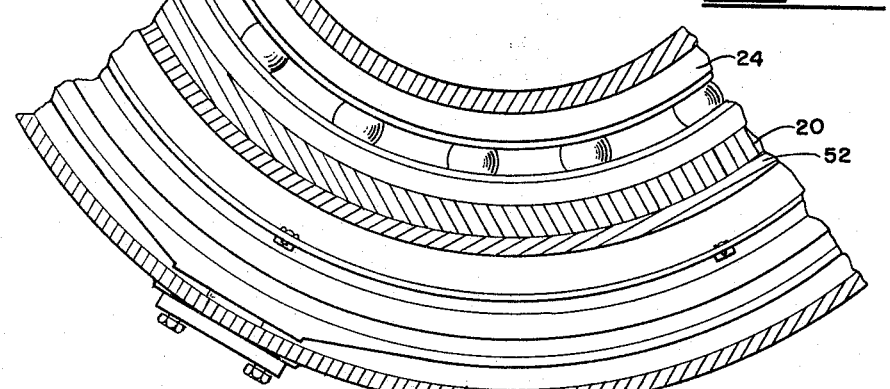
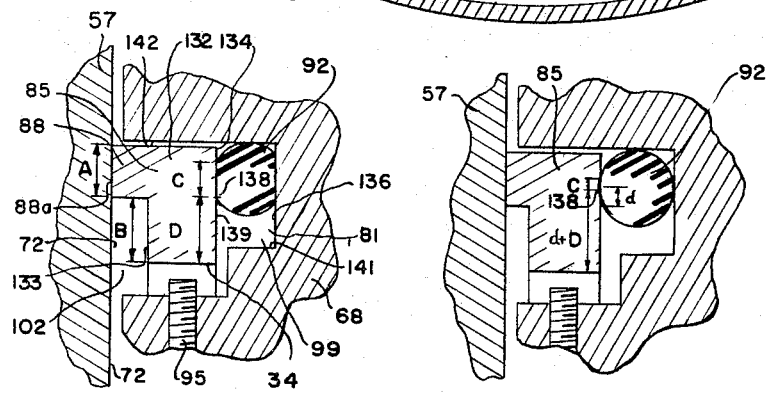
Fig. 5.    Fig. 6.
INVENTOR.
JOHN K. WOOLLAM
BY
*Featherstonhaugh & Co.*

3,330,562
ROTARY AIR SEAL
John K. Woollam, Vancouver, British Columbia, Canada, assignor to Brunette Machine Works Ltd., New Westminster, British Columbia, Canada, a corporation of British Columbia
Filed Mar. 12, 1964, Ser. No. 351,362
4 Claims. (Cl. 277—27)

This invention relates to a rotary seal adapted for use between two relatively rotatable members wherein it is desired to transfer a pressurized gaseous medium from one member to the other.

The primary object of the present invention is to provide a rotary seal between two relatively rotatable parts of relatively large diameter to effect the transfer of compressed air between the two parts, wherein the bearing pressure of the seal remains constant regardless of the pressure of the compressed air, and which automatically compensates for wear of the sealing surfaces.

Another object is to provide a seal which is cheap to manufacture and relatively easy to install.

The problem of sealing parts of rotating surfaces, for example, those present in ring-type log barkers, in which the barker teeth pressures are adjustably maintained by compressed air, has to date resulted in the production of very expensive equipment which is subject to excessive wear, due primarily to the higher pressures required and the excessive sealing areas involved. The present invention overcomes these problems by providing a sealing device in which the sealing surfaces are metallic, thereby resulting in very little wear and in which the pressure applied between the sealing surfaces is not excessive and is independent of the air pressure. If wear does occur between sealing parts, the device will automatically adjust itself for such wear without increasing the sealing pressure.

The present invention comprises a rotatable member, an annular collar secured to the rotatable member for rotation therewith, said collar having a base and spaced shoulders extending radially therefrom, an annular stationary member encircling the rotatable member within the confines of the collar and spaced from the shoulders and base thereof to form an annular chamber therebetween, air passages through the rotatable member and collar and communicating with the annular chamber, air passages through the stationary member and communicating with the annular chamber, static sealing rings interposed for axial movement between the collar shoulder and the stationary member, said rings each presenting opposite annular end faces of substantially the same area to the gas to be sealed, connector means non-rotatably connecting the rings to the stationary member, resilient annular sealing means interposed under compression between the rings and stationary member to normally urge the former into engagement with the collar shoulders.

In the drawings which illustrate the embodiments of the invention:

FIGURE 1 is an end view of a ring-type barker,

FIGURE 2 is a section taken on the line 2—2 of FIGURE 1,

FIGURE 3 is a section taken on line 3—3 of FIGURE 2,

FIGURE 4 is an enlarged fragmentary view at the sealing means,

FIGURE 5 is a fragmentary view of a portion of FIGURE 2 before any wear of the parts has occurred, and FIGURE 6 is a view similar to FIGURE 5 after wear of certain parts has occurred.

Referring to the accompanying drawings, 10 generally represents a rotary seal which to more clearly illustrate its function is shown mounted on a ring-type barker having a ring housing 12 which is annular in configuration and is rigidly fixed to a frame having members 13 suitably connected thereto to hold it against lateral or axial movement. Barker tools 14 and compressed air cylinders 16 are shown in FIGURE 1 in an arrangement standard to this type of barker.

An annular shaft 20 is mounted concentrically within the housing 12 for rotation. By referring to FIGURE 2, it will be seen that the shaft 20 which has an inner end 21 and on outer end 22 is mounted in the housing 12 against axial movement relative thereto on two directional thrust cup and cone ball bearings 24, the inner races 26 of which are mounted on and in axially fixed relationship to the housing 12 being frictionally embraced between annular caps 28 and 29, cap 29 being bolted to said housing. The outer races 32 of the bearings 24 are mounted on and in axially fixed relationship to the shaft 20 being located between a pair of annular caps 34 and 35, cap 34 being bolted to the inner end 21 of the shaft and cap 35 being pressed against the races 32 by an annular flange 38, said flange being bolted to the outer end 22 of the shaft 20. It will also be noted that the periphery of the annular cap 34 projects radially outwardly beyond the periphery of the shaft 20, thereby forming an inner annular shoulder 40 and the annular flange 38 likewise projects radially outwardly beyond the periphery of and inwardly towards end 20 of the shaft to form an outer annular shoulder 42.

The annular flange 38 carries the barker tools 14 and compressed air cylinders 16 and is provided with a plurality of air passages 44 having inner ports 46 formed in its outer shoulder 42, said ports lying between two annular recesses 48 and 49 formed concentrically in said outer shoulder. The outer ports 50 of said passages are suitably connected by air conduits 51 to the compresed air cylinders 16.

An annular collar 52 and an annular drive sprocket 54 are mounted on the shaft 20 between the inner shoulder 40 of the inner cap 34, and the outer shoulder 42 of the annular flange 38, each being keyed to the shaft 20 by a key and recess assembly, not shown, for rotation with the shaft 20 and restrained against axial movement relative the shaft by the aforesaid inner and outer shoulders 40 and 42, respectively. The shaft 20, the collar 52 and the annular flange 38 being rotated by the annular drive sprocket 54 which is itself chain driven by a motor, not shown.

The collar 52 is substantially U-shaped in cross section having a circumferentially separable base 55 with a pair of outwardly extending parallel annular sides 56 and 57 upstanding therefrom, the two halves of the base 55 abutting one another and being sealed by a rubber O-ring 58 inserted in an annular recess of one of the parts of the base 55. The collar is also provided with a plurality of passageways 59 through the side 57 thereof, said passageways 59 aligning with passageways 44 in the annular flange 38. Rubber O-rings 60 and 61 which fit, under compression, within the annular recesses 48 and 49, respectively, serve to seal the abutting faces of the collar 52 and the annular flange 38.

An annular stationary member 68 secured to the housing 12 against lateral movement relative thereto by mounting means hereinafter described, is positioned within the sides 56 and 57 of the collar. The stationary member 68 is rectangular in cross section, has opposite end faces 70 and 71 lying parallel to inner faces 72 and 73 of the said sides 57 and 56, respectively, and an inner circumferential wall 74, the diameter of which is somewhat greater than the diameter of the base 55 of the collar, thereby forming an annular air chamber 76 therebetween. The width of the stationary member between the faces 70 and 71 is somewhat less than the distance between the faces 72 and 73 of the collar, thereby permitting the collar to rotate freely within the annular member, the spaces between said opposite faces of the annular member and said inner faces 72 and 73 of the collar forming annular air passages 78 and 79, respectively.

The opposite faces 70 and 71 of the stationary member 68 are provided with a pair of annular recesses 81 and 82, respectively, see FIGURE 4, concentrically formed therein and which are adapted to receive a pair of metallic sealing rings 85 and 86 formed with outwardly projecting bearing flanges 88 and 89 having outer annular sealing surfaces 88a and 89a, respectively. The sealing rings are urged outwardly against the inner faces 72 and 73 of the collar by resilient or rubber O-rings 92 and 93 mounted, under axial compression, in the recesses 81 and 82 respectively, inwardly of said sealing rings 85 and 86. The sealing rings are non-rotatably secured to the stationary member by means of a plurality of set screws 95, suitably threaded through the stationary member 68 from the inner wall 74 thereof, the ends 96 of the set screws engaging corresponding longitudinal slots or recesses 97 and 98 in the sealing rings. By referring to FIGURES 2 and 4, it will be seen that the set screws fit relatively loosely into the recesses 97 and 98 permitting axial movement of the sealing rings relative the stationary member but securing them from rotation relative thereto. It will also be noted that the annular recesses 81 and 82 are somewhat larger in cross section than the cross section of the sealing rings 85 and 86 respectively, thereby forming annular inner pressure chambers 99 and 100 respectively, annular outer pressure chambers 102 and 103 respectively, and annular communicating passages 104 and 105 respectively, therebetween. It will also be noted that the said inner and outer annular pressure chambers are in communication with annular chamber 76 via annular air passages 78 and 79.

The stationary member 68 is also provided with an air passage 106 bored radially therethrough, the outer port of which is enclosed by a cover plate 107 suitably secured to the periphery of the stationary member, thereby forming an inlet air chamber 108. An air inlet conduit 109 is threaded into an aperture 110 in the cover plate, said air conduit being connected to an air supply, not shown.

The annular stationary member 68 is secured to the housing 12, as hereinbefore described, against lateral movement relative thereto, by a plurality of caps 112 carrying inwardly projecting shafts 113 having reduced ends 116, adapted to snugly engage a plurality of correspondingly aligned recesses 115 formed in the periphery of the annular stationary member 68, said caps 112 being circumferentially disposed around, and secured to, the housing 12 by bolts 116 as shown in FIGURE 3. The recesses 115 are slightly elongated axially to permit a little lateral play between the shafts 113 and said recesses. The member 68 will therefore self-centre itself within collar 52 to equalize the axial thrust between each of the sealing rings and its corresponding collar face. Although the annular stationary member 68 may be disposed concentrically to the shaft 20, it is preferable that it be disposed eccentrically thereto. Concentric mounting would result in the annular bearing flanges 88 and 89 of sealing rings 85 and 86 slidably engaging annular contact surfaces on the inner faces 72 and 73 respectively, of the collar 52, of somewhat the same area as the area of the bearing flanges 88 and 89. However, by mounting the annular stationary member eccentrically relative to the shaft, the bearing flanges will then slidably engage a much larger contact surface of the inner faces of the collar, thereby reducing the depth of wear of said inner faces. In the preferred eccentric disposition of the stationary member relative to the collar, shims 114 of various predetermined thicknesses may be interposed between each cap 112 and the housing 12 to thereby adjust the stationary member eccentrically to the collar. Lubrication of the sealing surfaces is achieved by the installation of an oil mist nozzle 130 threaded through and into the air inlet conduit 109. Oil injected into the air stream will tend to find its way downwardly into the annular chamber 76 and on to the base 55 of the collar. Due to the centrifugal force exerted upon it by the rotation of the collar, the oil will tend to travel radially outwardly along the inner faces 72 and 73 of the collar and lubricate the bearing surface between the bearing flanges 88 and 89 and the inner collar faces 72 and 73 respectively.

In accordance with the description foregoing, inner annular pressure chambers 99 and 100 and outer annular pressure chambers 102 and 103 are in communication with the annular chamber 76 via annular air passages 78 and 79. Said inner and outer annular pressure chambers are thereby pressurized by the compressed air, being sealed by the action of the bearing flanges 88 and 89 against the inner collar faces 72 and 73 respectively, on one side of the sealing rings 85 and 86 and by the rubber O-rings 92 and 93 on the other side of said sealing rings.

One of the attributes of this invention in accordance with the objects and description hereinbefore specified, lies in the method of producing a constant contact pressure between the bearing flanges 88 and 89 and the inner faces 72 and 73 of the collar, independently of the pressure of the compressed air. In the description following, reference will be made only to sealing ring 85 and O-ring 92 which are contained within the annular recess 81 in the annular stationary member 68. As shown in FIGURE 5, the sealing ring 85 has the bearing flange 88 projecting outwardly from an outer end 132 thereof, the outer annular sealing surface 88a of the bearing flange slidably engaging the inner face 72 of the collar, thereby forming an air seal of effective radial width designated upon FIGURE 5 by the letter A. The remaining annular intermediate annular surface 133 of the sealing ring is spaced inwardly from said inner face 72 thereby forming the outer annular pressure chamber 102 previously referred to, the radial width of surface 133 being designated by B. The rubber O-ring 92 which lies under compression between the inner annular sealing surface 134 of the sealing ring and the bottom 136 of the recess 81 and which thereby urges the sealing ring outwardly against the inner face 72 of the collar, is deformed, due to pressure, into a substantially oval shape and contacts the sealing ring over a contact portion of sealing surface 134, the radial width of said contact portion being designated by C, the radially inner edge of said contact portion being indicated at 138 in FIGURE 5. The O-ring 92 also forms an effective seal between the inner surface 134 of the sealing ring and the bottom 136 of the recess resulting in the inner annular air chamber 99, one wall of which is that portion of the inner surface of the sealing ring lying radially inwardly of said inner edge 138 and by an exposed pressure surface a pressure surface numbered 139, the radial width of which is designated as D. Recess 81 is formed with concentric inner and outer side walls 141 and 142, and O-ring 92 bears against said outer wall.

The recess 81, sealing ring 85 and O-ring 92 are so correlated in size that when the parts are relatively new, that is, prior to any wear between the bearing flange 88 and the inner face 72 of the collar, radial width B of intermediate surface 133 is substantially equal to radial width D of exposed pressure surface 139. As the chambers 99 and 102 are in communication with each other, the total pressure of the compressed air exerted on each said surfaces or areas 133 and 139 thereof is substantially the same. The only force urging the sealing ring outwardly against the inner face 72 of the collar is therefore produced by the compressed O-ring acting outwardly through contact face C. As wear occurs between the parts, the sealing ring will gradually move outwardly and at a certain outward position the parts will assume a position as shown in FIGURE 6. As the wear takes place, O-ring 92, being constructed of resilient material, tends to expand towards its normal cross sectional shape, thereby forcing the sealing ring against face 72. As the O-ring approaches its normal circular cross sectional shape, the contact surface C narrows, resulting in inner edge 138 moving radially outwardly towards the periphery of the sealing ring, thereby increasing radial width D of exposed surface 139 by an incremental radial width herein designated as $d$. The O-ring 92 as shown in FIGURE 6 exerts an outward force substantially reduced in relation to the force it exerted as shown in FIGURE 5. The reduced outward force of said O-ring, however, is compensated for by the additional force of the compressed air exerted upon the increased exposed surface 139, the radial width of which is now $D-d$. The total outward pressure maintained by the bearing flange 88 against the inner faces 72 of the collar therefore remains substantially unchanged.

What I claim as my invention is:

1. A rotary air seal to effect the transfer of a presurized gas between two relatively rotatable parts comprising a rotatable member, an annular collar secured to the rotatable member for rotation therewith, said collar having a base and spaced shoulders extending radially therefrom, an annular stationary member encircling the rotatable member within the confines of the collar and spaced from the shoulders and base thereof to form an annular chamber therebetween, said stationary member having opposed annular faces confronting each of said shoulders, each of said annular faces having an annular recess formed therein communicating with said annular chamber, each of said recesses having a bottom and concentric inner and outer side walls, air passage means through the rotatable member and collar communicating with the annular chamber, air passage means through the stationary member and communicating with the annular chamber, a sealing ring in each recess and being spaced from the bottom wall thereof, each of said rings being of L-shaped cross sectional configuration and having on one side thereof an outer annular sealing surface adapted to sealably and slidably engage its associated collar shoulder and in inwardly-spaced intermediate annular surface exposed to the gas to be sealed in the annular chamber and on the opposite side thereof, an inner annular surface of greater area than said intermediate annular surface, connecting means for non-rotatably connecting each sealing ring to the stationary member for axial movement relative thereto, and a resiliently compressible O-ring normally of circular cross section interposed under compression between the inner annular surface of each of said sealing rings and the bottom of the recess of said each ring and bearing against the outer side wall of the latter recess to urge said each sealing ring towards and into engagement with the adjacent collar shoulder, each of said O-rings prior to wear of the outer annular sealing surface of its associated sealing ring sealably engaging the adjacent inner annular surface over a contact portion of the latter annular surface, the radial inner edge of which defines the outer peripheral edge of an exposed pressure surface on said inner annular surface which is exposed to the gas to be sealed and normally having an area substantially the same as the area of the intermediate annular surface so as to equalize the total gas pressure on opposite sides of the sealing ring and as the outer annular surfaces of the sealing rings wear away said O-rings tend to expand towards their normal cross sectional shape resulting in a decrease of the radial width of said contact portions of said inner annular surfaces and an increase in the areas of the exposed pressure surfaces of said annular surfaces.

2. A rotary air seal as claimed in claim 1 in which the connector means comprises a plurality of transversely extending slots formed in the sealing rings and bolts threadedly extending through the stationary member and into said slots.

3. A rotary air seal as claimed in claim 1 in which the sealing rings are eccentrically disposed relative to the annular collar.

4. A rotary air seal as claimed in claim 1 wherein the collar has a U-shaped cross sectional configuration.

References Cited

UNITED STATES PATENTS

| | | | |
|---|---|---|---|
| 2,230,881 | 2/1941 | Browne | 277—65 X |
| 3,190,661 | 6/1965 | Wahl et al. | 277—136 X |

FOREIGN PATENTS 661,110   11/1951   Great Britain.

LAVERNE D. GEIGER, *Primary Examiner.*

J. MEDNICK, *Assistant Examiner.*